United States Patent
Gruhlke et al.

(10) Patent No.: US 7,214,926 B2
(45) Date of Patent: May 8, 2007

(54) IMAGING SYSTEMS AND METHODS

(75) Inventors: Russell W. Gruhlke, Fort Collins, CO (US); Dale W. Schroeder, Scotts Valley, CA (US); John H. Stanback, Fort Collins, CO (US)

(73) Assignee: Micron Technology, Inc., Boise, ID (US)

( * ) Notice: Subject to any disclaimer, the term of this patent is extended or adjusted under 35 U.S.C. 154(b) by 210 days.

(21) Appl. No.: 10/994,077

(22) Filed: Nov. 19, 2004

(65) Prior Publication Data
US 2006/0108505 A1   May 25, 2006

(51) Int. Cl.
*H01J 40/14* (2006.01)

(52) U.S. Cl. .................... 250/226; 250/208.1
(58) Field of Classification Search ............ 250/208.1, 250/226, 216; 348/104, 262–265
See application file for complete search history.

(56) References Cited

U.S. PATENT DOCUMENTS 5,166,961 A * 11/1992 Brunnett et al. ............. 378/19
6,064,057 A * 5/2000 Shimomura et al. ........ 250/226
6,239,425 B1 * 5/2001 Hunt .......................... 250/226
6,738,164 B1 * 5/2004 Shimomura et al. ........ 358/474

* cited by examiner

*Primary Examiner*—Thanh X. Luu
*Assistant Examiner*—Tony Ko
(74) *Attorney, Agent, or Firm*—RatnerPrestia (57) ABSTRACT

Imaging systems and methods are provided. One exemplary system incorporates multiple lenses that are individually configured to receive multi-wavelength light from an object to be imaged. Each lens provides an optimal modulation transfer function (MTF) for an individual wavelength contained in the multi-wavelength light when this individual wavelength of light strikes the lens at a particular incident angle. Associated with each lens is a color filter and a sensor. The color filter receives the multi-wavelength light from the lens, and transmits the individual wavelength of light on to the sensor. The image signals obtained from each of the multiple sensors are combined to generate an image of the object.

17 Claims, 8 Drawing Sheets

IMAGING SYSTEMS AND METHODS

DESCRIPTION OF THE RELATED ART

Image capture devices such as digital cameras, desktop cameras attached to personal computers, and cameras built into mobile telephones, are undergoing an evolution process that is a typical aspect of any product development cycle. A few examples of product evolution in image capture devices are: advances in packaging/manufacturing techniques to minimize product size, increasing pixel density to provide higher image resolution, and using larger memories to increase image storage capacity. While noticeable improvements have been made in such aspects, there still remains many improvements to be carried out upon the optical components of image capture devices, specifically the camera lens through which light is directed on to an electronic image sensor. Some problems associated with a camera lens include optical aberrations, poor peripheral imaging performance, and poor transmission of certain colors.

The optical characteristics of a lens, or any optical device in general, can be quantified by an industry-wide term known as modulation transfer function (MTF). MTF is the spatial frequency response of an imaging system or component, and is a measure of the contrast at a given spatial frequency relative to low frequencies. High spatial frequencies correspond to fine image details, consequently the more extended the spatial frequency bandwidth, the sharper the image. Attention is drawn to FIGS. 1 and 2 for a further explanation of MTF.

Figure 1:
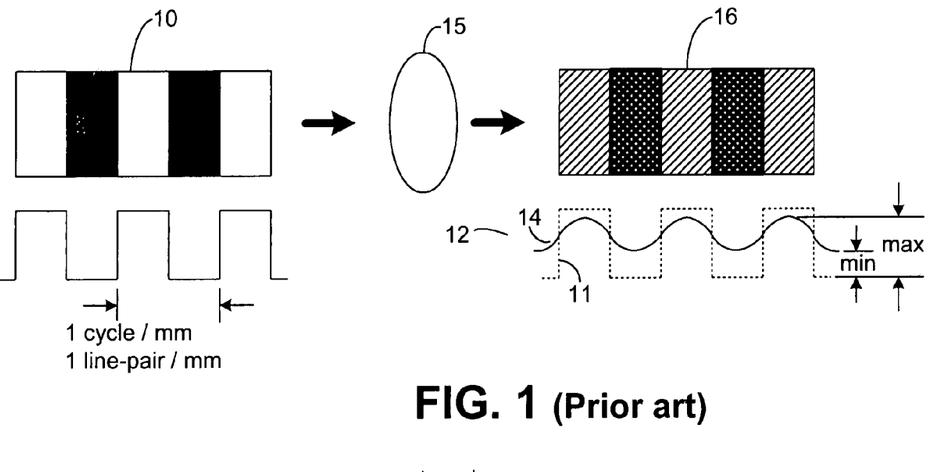
FIG. 1 is a prior-art illustration of a bar target together with a lens and an image, that is used to describe modulation transfer function (MTF).

FIG. 1 illustrates a bar target 10 that is imaged through lens 15 to produce a captured image 16. Bar target 10 is an alternating black-white bar image, with one white bar together with one black bar typically referred to as 1 cycle/mm or 1 line-pair/mm. MTF varies between a range of 0 to 1, with a value of 0 indicating a complete blurring of the bar target, and a value of 1 indicating an ideal one-to-one imaging of the bar target. The MTF values for captured image 16 are shown in waveform 14, in comparison to that of an ideally-captured image which is shown by the dashed line waveform 11. The minimum and maximum values of MTF disclosed by waveform 14 represent the image contrast present in captured image 16.

Figure 2:
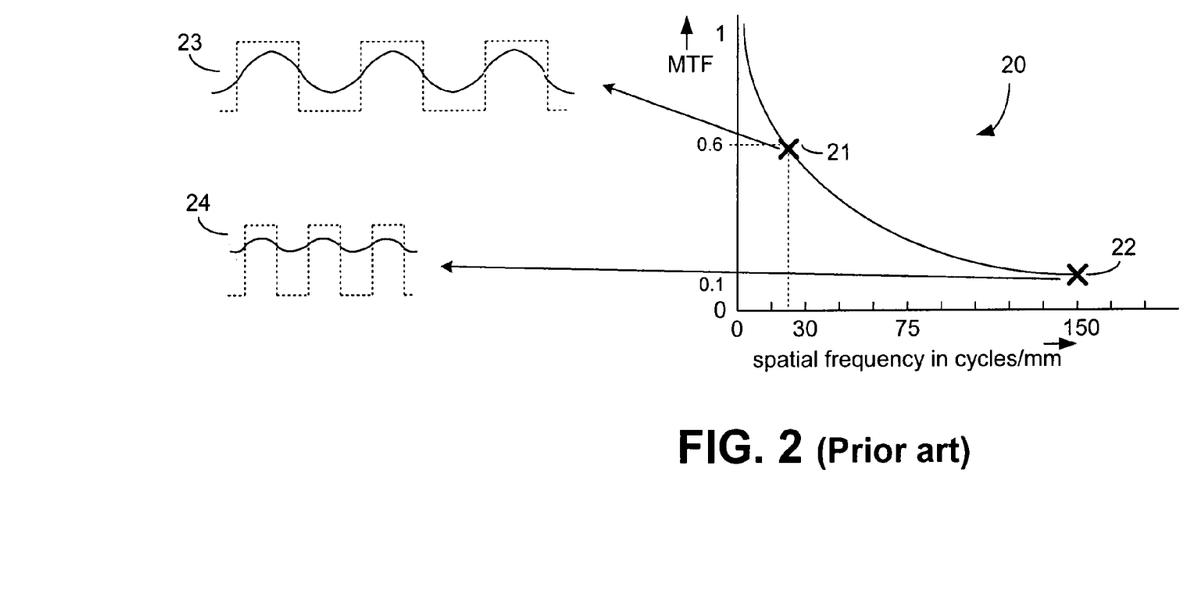
FIG. 2 is a prior-art graph of spatial frequency versus MTF to illustrate typical values of MTF for two different spatial frequencies.

FIG. 2 is a graph 20 of spatial frequency versus MTF for an imaging system. The graph shows an MTF value centered around 0.6 for a waveform of spatial frequency 25 cycles/mm, and an MTF value centered around 0.1 for a waveform of spatial frequency 150 cycles/mm. The MTF values for a bar target of 25 cycles/mm is indicated by waveform 23, while that for a bar target of 150 cycles/mm is indicated by waveform 24.

It can therefore be seen that MTF values are dependent upon spatial frequency.

Furthermore, MTF values are also dependent upon the incidence angle of light. The incidence angle is the angle at which a beam of light strikes a lens with reference to an optical axis of the lens. Certain single-lens imaging systems as well as double-lens systems, such as those used in cameras built into cellphones, suffer from this limitation. Consequently, such systems provide optimal MTF centered only around one incidence angle, thereby constraining acceptable imaging to a limited range of incidence angles around this optimum incidence angle. Consequently, if the MTF is optimized for an incidence angle centered upon the optical axis, the peripheral imaging performance of the camera in which this lens is used, turns out to be poor.

Figure 3:
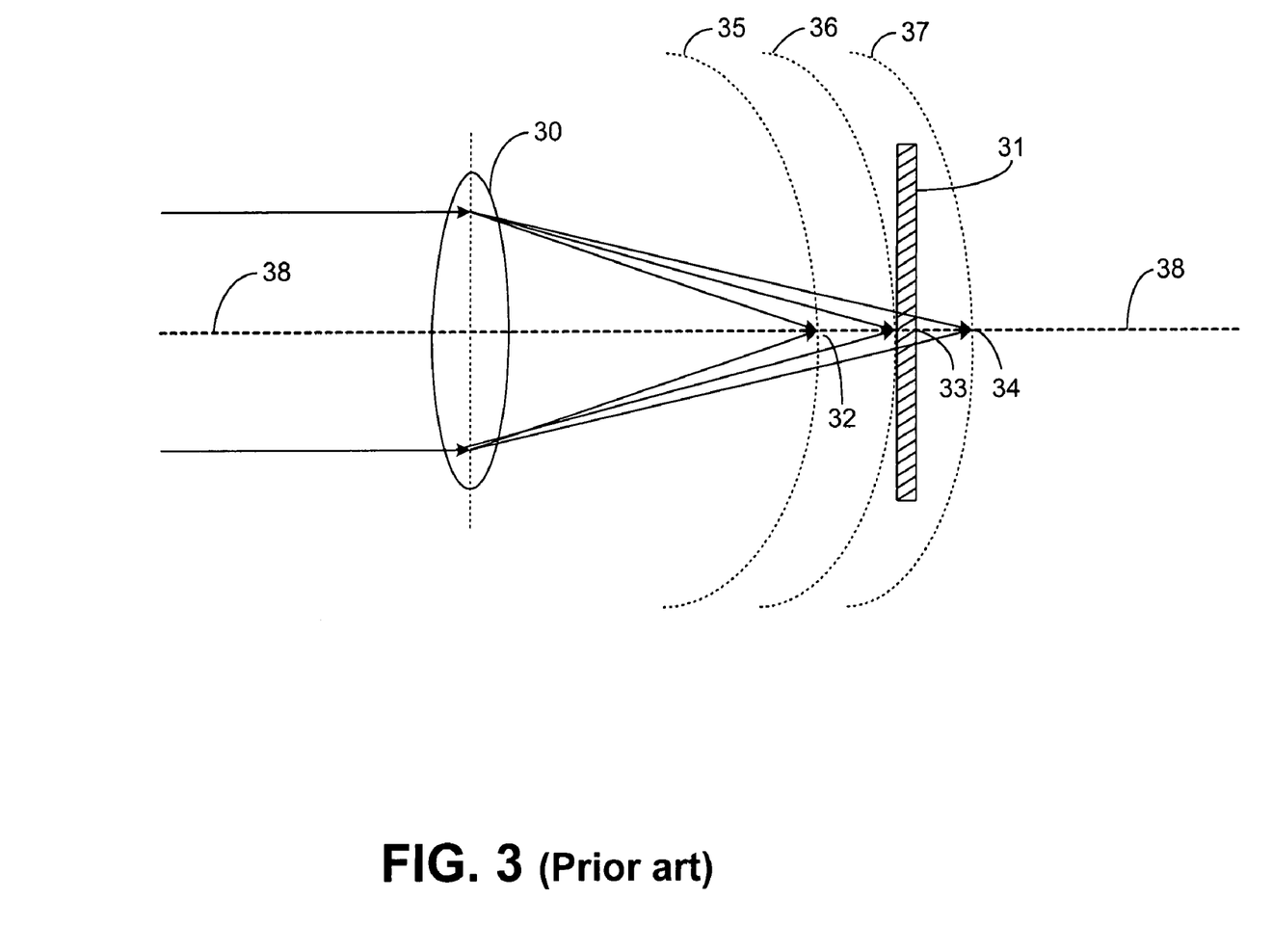
FIG. 3 shows a prior-art single lens system together with focal points along the optical axis for three different wavelengths.

MTF variation with reference to various colors is illustrated in FIG. 3, which shows a single lens 30 directing light containing multiple wavelengths along optical axis 38 towards a sensor 31. Dotted lines 35, 36, and 37 each describes a locus of focal points for three wavelength components—blue, green, and red respectively. Green light has a focal point 33 on the sensor 31 along optical plane 38. Consequently, the green component of the incoming light is well focused and imaged accurately. Unfortunately, the blue and the red components can never obtain perfect focus along the optical axis 38, as can be seen from focal points 32 and 34 which are located away from sensor 31.

It can therefore be appreciated that it would be desirable to have imaging systems and methods that overcome one or more of the drawbacks identified above.

SUMMARY OF THE INVENTION

In accordance with the invention, imaging systems incorporate multiple lenses that are individually configured to receive multi-wavelength light from an object to be imaged. Each lens provides an optimal modulation transfer function (MTF) for an individual wavelength contained in the multi-wavelength light when this individual wavelength of light strikes the lens at a particular incident angle. Associated with each lens is a color filter and a sensor. The color filter receives the multi-wavelength light from the lens, and transmits the individual wavelength of light on to the associated sensor. The image signals obtained from the multiple sensors are then combined to generate an image of the object.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The various embodiments in accordance with the invention describe systems and methods for imaging. The imaging systems generally incorporate multiple lenses that are individually configured to receive multi-wavelength light from an object to be imaged. Each lens provides an optimal modulation transfer function (MTF) for an individual wavelength contained in the multi-wavelength light when this individual wavelength of light strikes the lens at a particular incident angle. Associated with each lens is a color filter and a sensor. The color filter receives the multi-wavelength light from the lens, and transmits the individual wavelength of light on to the associated sensor. The image signals obtained from the multiple sensors are then combined to generate an image of the object.

In an exemplary embodiment, a three-lens system comprises a first lens configured to optimize the MTF of a first wavelength incident along the optical axis of the first lens, a second lens configured to optimize the MTF of a second wavelength incident at a first angle with reference to the optical axis of the second lens, and a third lens configured to optimize the MTF of a third wavelength incident at a second angle with reference to the optical axis of the third lens. In accordance with one embodiment of the invention, the first wavelength corresponds to green light, the second wavelength to red light, and the third wavelength corresponds to blue light. In other embodiments, wavelengths corresponding to other colors may be used.

Operation of one of the lenses, the third lens, together with additional components associated with the imaging system mentioned above, will be now explained using FIG. 4. Lens 400 is configured to receive light from an object 460 to be imaged. Object 460 may be a single object located at a distance away from lens 400, or may comprise several objects as would be typically present when taking a photograph, for example. The received light contains multiple wavelengths, and strikes lens 400 at various incident angles. Lens 400 directs the multi-wavelength light through a color filter 470 towards optical sensor 415. In this example, color filter 470 is selected to transmit blue light towards sensor 415. Of the three incident angles shown, blue light that is incident along the optical axis 410 has a focal point 435 located on the optical axis 410 behind sensor 415. Blue light that is incident along path 421 has a focal point 440 on the optical sensor 415, while blue light traveling along path 427 has a focal point 430, which is also on the optical sensor 415. Consequently, optimal imaging of blue light is obtained at focal points 430 and 440, while a sub-optimal image is obtained at the sensor 415 along the optical axis 410. Such an arrangement permits good off-axis imaging, by maximizing the MTF for incident light along an angular path such as paths 421 and 427.

Figure 4:
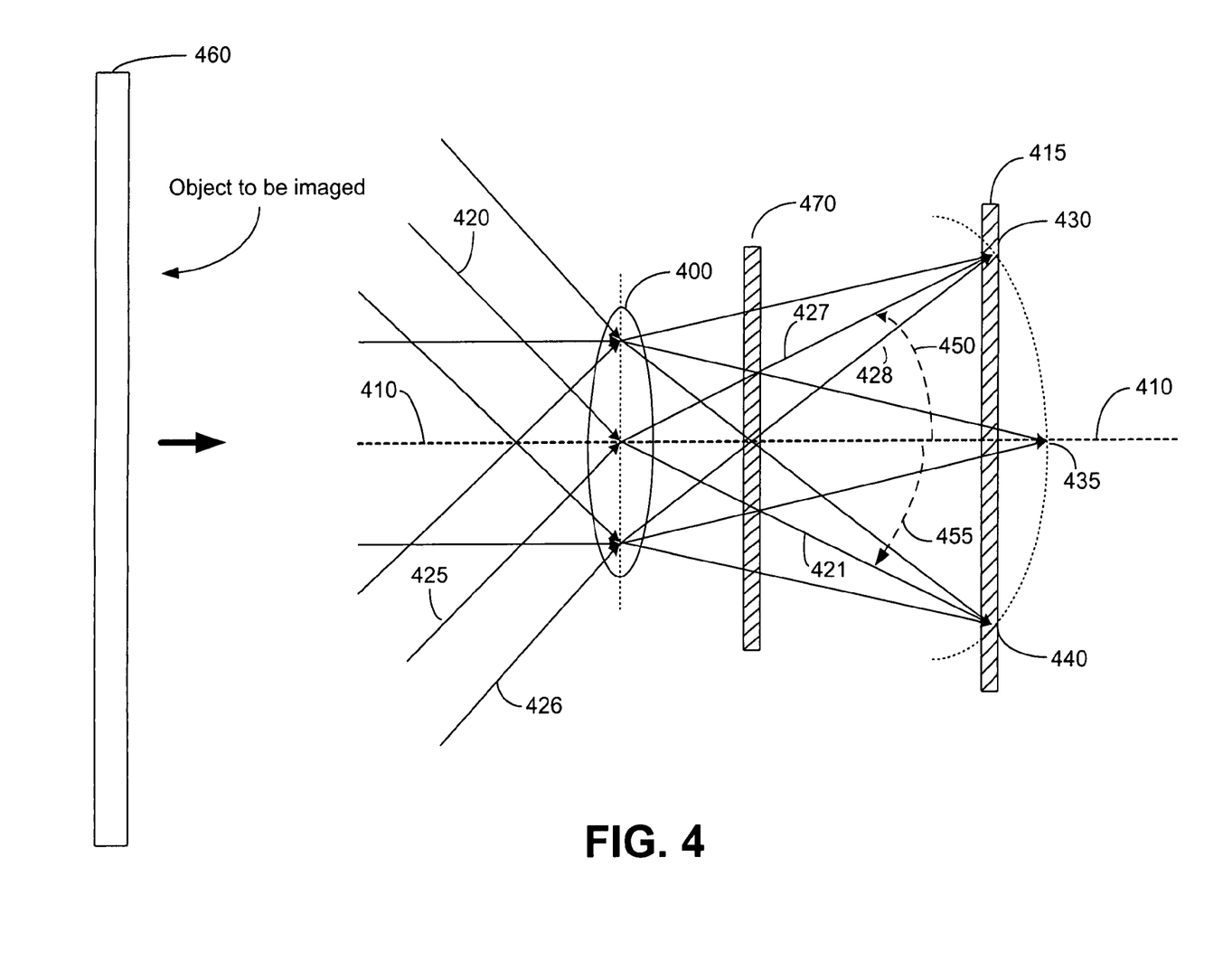
FIG. 4 shows a single-lens imaging system configured to provide optimal off-axis imaging for light of a first wavelength.

The multi-wavelength light along path 425 is incident upon lens 400 with a certain angle that is slightly different from angle 450, which is the incident angle for the blue component of the multi-wavelength light, along path 427 towards sensor 415. The difference in angular values between paths 425 and 427 is in part, due to refraction inside lens 400. In accordance with the invention, light along path 427 has an incident angle 450, but it will be understood that the focusing action of lens 400 is operative upon several optical paths of light that are parallel to path 425. For example, the blue component of light incident upon lens 400 along path 426 is directed towards sensor 415 along path 428 at an incident angle that is substantially similar to angle 450.

Multi-wavelength light along path 420 traverses lens 400, with optimal MTF, and the blue component travels towards sensor 415 along path 421 at an incident angle 455, which corresponds in value to angle 450. The focusing action of lens 400 upon multi-wavelength light along optical paths that are parallel to path 420 is similar to that described above with reference to path 425.

Figure 5A:
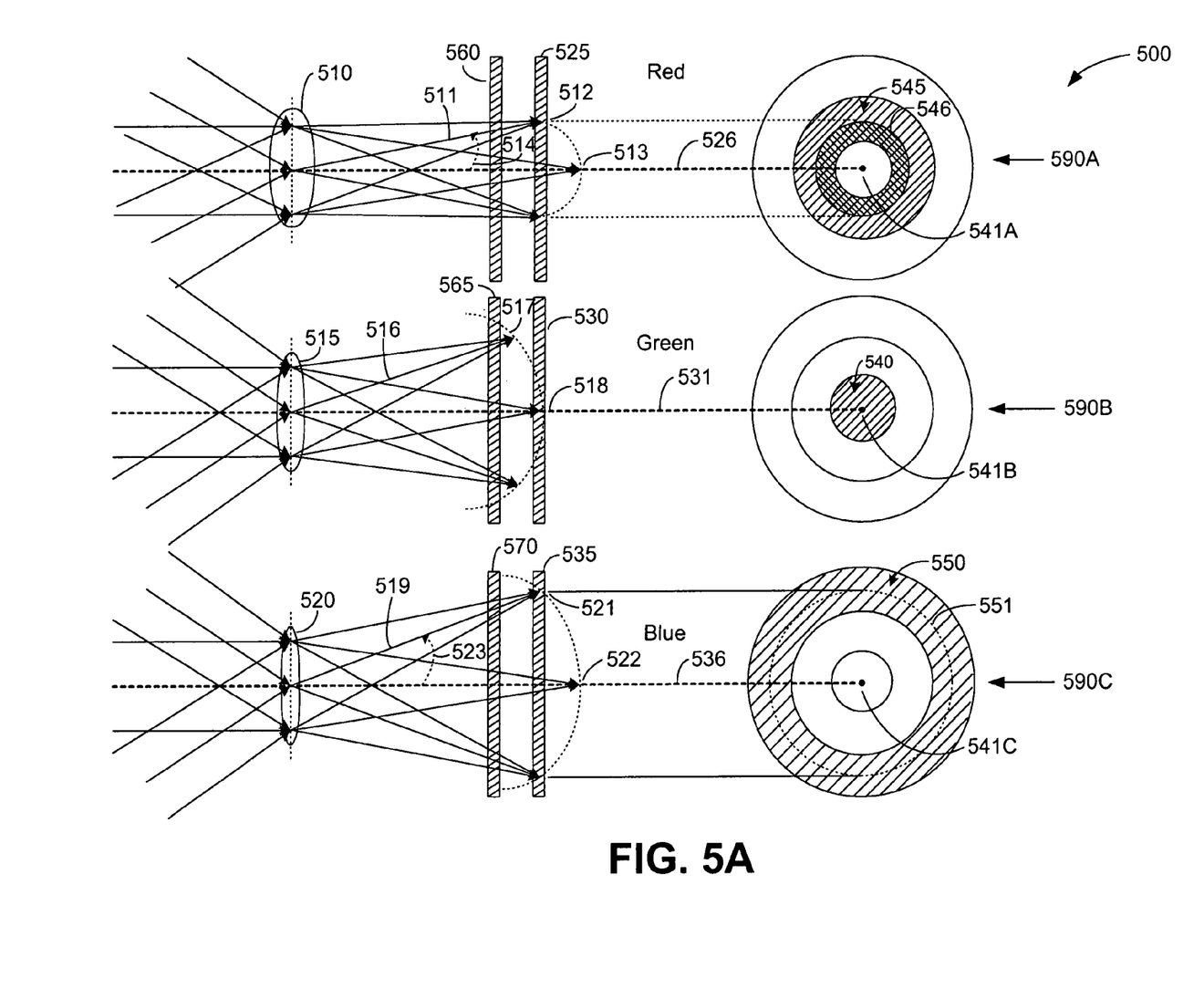
FIG. 5A shows three lenses configured to provide optimal on-axis as well as optimal off-axis imaging for three wavelengths of light.

FIG. 5A shows an imaging system 500 comprising a first lens 515 that provides optimal on-axis imaging and two additional lenses 510 and 520 that provide optimal off-axis imaging of one or more objects (not shown) located at a distance from system 500. It will be understood that the term "optimal imaging" refers to providing an optimal MTF value, which can be generally obtained by suitably configuring a lens. For example, in a first embodiment the shape of the lens is configured to have a certain radius of curvature and a certain thickness. In another embodiment, an aspheric lens is used. The aspheric lens has various aspheric coefficients tailored to provide a desired MTF. The aspheric lens may also be selected to have other parameters, such as a desired conic constant at its vertex, selected to provide a desired MTF. In yet another embodiment in accordance with the invention, an air-gap between two lenses of a doublet lens system can be configured to provide a desired MTF at a desired incident angle. It will be also understood that the colors red, green, and blue are used below for purposes of explanation, and other colors will be used in other embodiments.

Multi-wavelength light traveling from the object(s) is received by the three lenses 510, 515, and 520. In an embodiment in accordance with the invention, lens 510 together with red color filter 560 is configured to provide maximum MTF for the red component directed towards pixilated sensor 525 at an incident angle 514. At this angle, the red light is optimally imaged on pixilated sensor 525 at focal point 512, which is off-axis with respect to optical axis 526.

Image 590A that is generated from the pixel sensor elements of pixilated sensor 525 has a region 545 of high MTF for red light, with peak MTF along the dotted line 546. The MTF for red light is comparatively lower in the region outside region 545. For example, the MTF at the point 541A will be significantly lower than that along the dotted line 546. Also, the MTF at the outer-most edges of image 590A will also be significantly lower than that along the dotted line 546.

Lens 515 together with green color filter 565 is configured to provide maximum MTF for the green component that is directed towards pixilated sensor 530 along optical axis 531. The green component is optimally imaged on pixilated sensor 530 at focal point 518, which is on-axis with respect to optical axis 531.

Image 590B that is generated from the pixel sensor elements of pixilated sensor 530 has a region 540 of high MTF for green light, with peak MTF at point 541B. The MTF for green light is comparatively lower in the region outside region 540. For example, the MTF at the outer-most edges of image 590B will be significantly lower than that at point 541B.

Lens 520 together with blue color filter 570 is configured to provide maximum MTF for the blue component that is directed towards pixilated sensor 535 at an incident angle 523. At this angle, the blue component is optimally imaged on pixilated sensor 535 at focal point 521, which is off-axis with respect to optical axis 536.

Image 590C that is generated from the pixel sensor elements of pixilated sensor 535 has a region 550 of high MTF for blue light, with peak MTF along the dotted line 551. The MTF for blue light is comparatively lower in the region outside region 550. For example, the MTF at the point 541C will be significantly lower than that along the dotted line 551.

In an exemplary embodiment, incident angle 523 is greater than incident angle 514, hence region 550 (blue) is an annular area that is larger than the annular area corresponding to region 545 (red). In accordance with the invention, the two incident angles may be set to be identical, or incident angle 514 may be set greater than incident angle 523.

Also, the thickness of the three lenses 510, 515, and 520 are different from one another to accommodate differences in signal propagation characteristics between red, green, and blue light, and also, to produce comparable signal amplitudes for each color from each of the three pixilated sensors 525, 530, and 535 respectively. In accordance with the invention, one or more of the three lenses are selected to be identical to one another, or different from one another in aspects such as MTF, lens size, lens shape, focal length, lens material etc., so as to produce various desired signals from the three sensors.

In an embodiment in accordance with the invention, only two lenses are used together with two color filters and two sensors. The first lens together with a corresponding color filter provides optimal MTF for light of a first wavelength that is incident along the optical axis of the first lens, while the second lens together with a corresponding color filter provides optimal MTF for light of a second wavelength that is incident at an angle with reference to the optical axis of the second lens. Such an embodiment provides optimal on-axis as well as optimal off-axis imaging for incident light containing two wavelengths.

In an embodiment in accordance with the invention, an imaging system comprises a first lens and associated color filter that provide optimal MTF for light of a first wavelength incident at a first angle with reference to the optical axis of the first lens, together with a second lens and associated color filter that provides optimal MTF for light of a second wavelength incident at a second angle with reference to the optical axis of the second lens. The embodiment provides optimal off-axis imaging for incident light containing two wavelengths at two incident angles, where the angles may or may not be similar to one another.

Figure 5B:
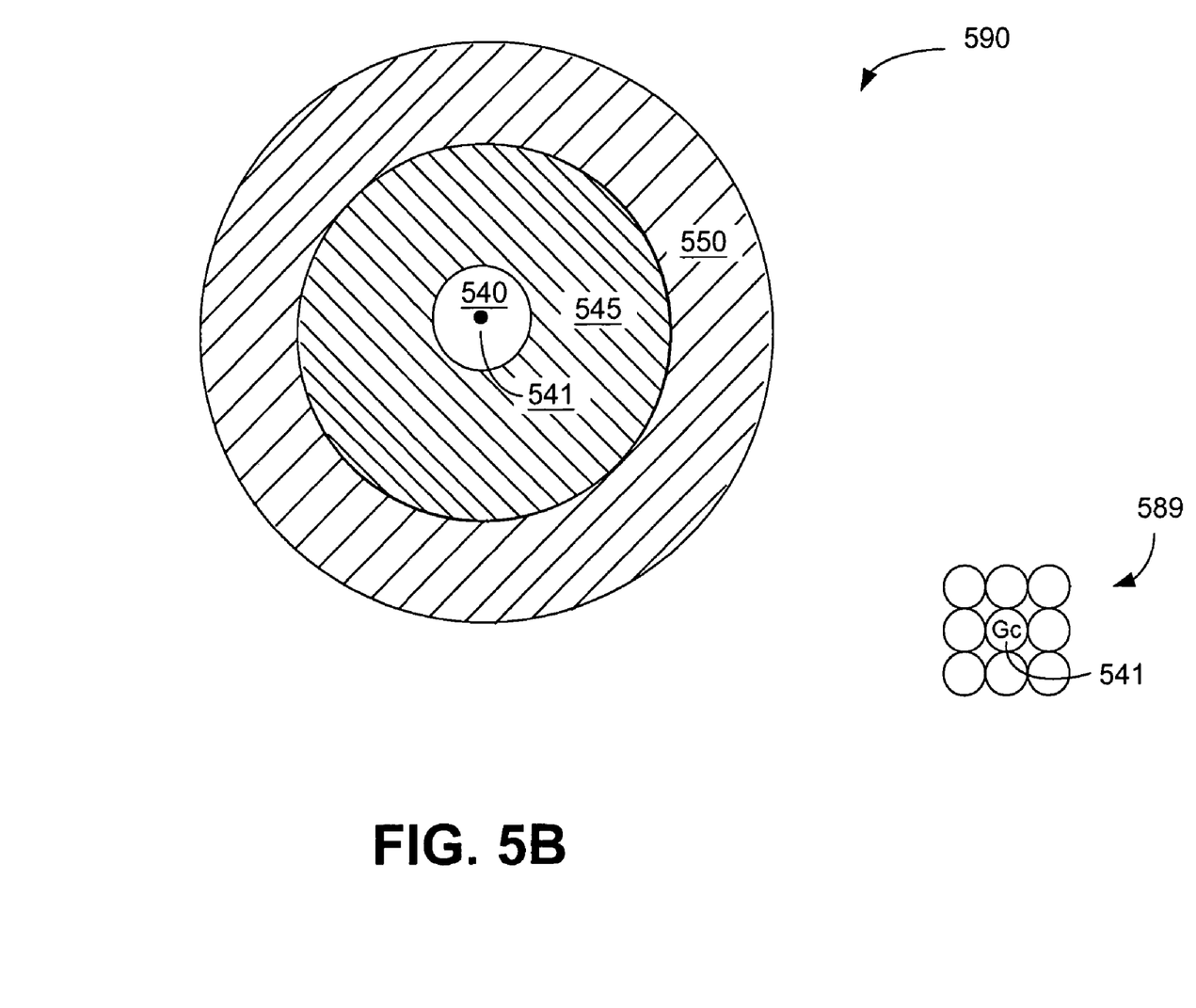
FIG. 5B shows a computed image generated from the system of FIG. 5A.

FIG. 5B shows a composite image 590 that is computed by combining pixel-level information from the image information contained in images 590A, 590B, and 590C. One embodiment for carrying out this combination is discussed below in context with FIG. 7.

Region 545 of composite image 590 corresponds to optimum imaging for the red component, region 540 for the green component, and region 550 for the blue component. Consequently, the green component of the image has optimum focus and maximum MTF in region 540. The green component has a lower MTF and poorer focus in regions 545 and 550 in comparison to region 540. Similarly, the red component has optimal focus and maximum MTF in region 545 in comparison to regions 540 and 550, while the blue component has optimal focus and maximum MTF in region 550 in comparison to regions 540 and 545.

Figure 6:
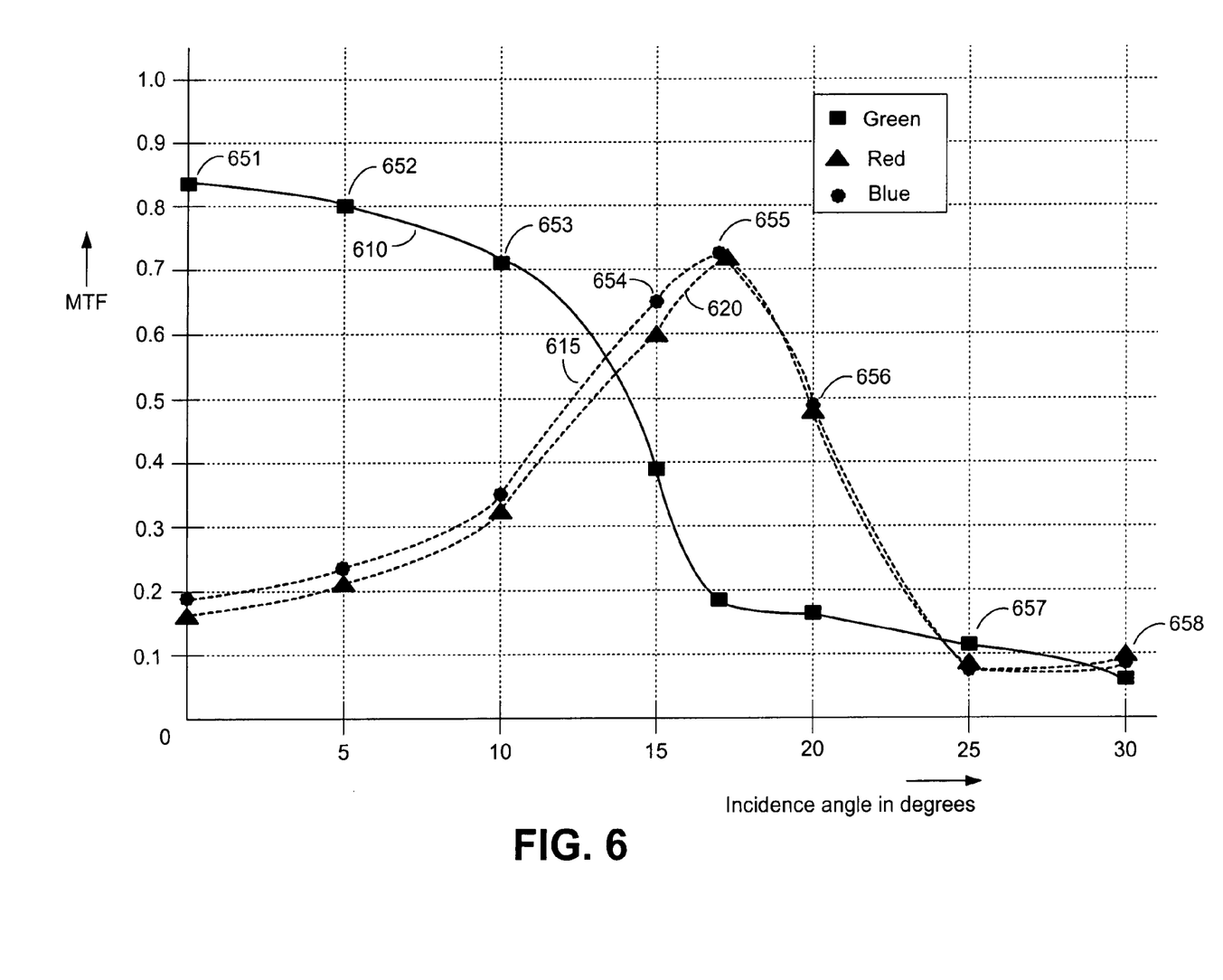
FIG. 6 is a graph depicting MTF versus incident angles for three different wavelengths, where each of the three wavelengths has an optimal MTF at one of three different incident angles.

Attention is now drawn to FIG. 6, which shows a graph of MTF versus incident angles for three different wavelengths, where each of the three wavelengths has an optimal MTF at one of three different incident angles. This graph corresponds to an exemplary imaging system, such as, for example, system 500 of FIG. 5. Curve 610 plots values of MTF for green light at various incident angles. In this case, a first lens together with a green color filter, has been configured to provide an optimal MTF value of approximately 0.83 at an incident angle of 0 degrees. This configuration provides optimal on-axis imaging of the green component.

Curve 620 plots values of MTF for red light at various incident angles. A second lens together with a red color filter, has been configured to provide an optimal MTF value of approximately 0.72 at an incident angle of 17 degrees. This configuration provides optimal off-axis imaging of the red component.

Curve 615 plots values of MTF for blue light at various incident angles. A third lens together with a blue color filter, has been configured to provide an optimal MTF value of approximately 0.71 at an incident angle of 17 degrees. This configuration provides optimal off-axis imaging of the blue component.

Curves 610, 615, and 620 can be combined into a composite MTF curve (not shown) that is roughly defined by the locus of points 651–658 as described below. The composite curve is obtained by extrapolating graphical values obtained from one or more of the three curves 610, 615, and 620 of FIG. 6. For example, this may be implemented as follows: for incident values below 13 degrees, where the green component predominates, the composite MTF is approximately defined by points 651, 652, and 653. For incident angles between 13 degrees and 17 degrees, the composite MTF is effectively identical to the MTF values of curves 615 and 620 because these values dominate over the MTF values of curve 610. Hence, the composite curve here is defined by points 654, 655, and 656. For incident angles greater than 24 degrees, the composite MTF is equal to a combination of MTF values from all three curves. These are approximately defined by points 657 and 658.

It can therefore be seen that low spatial frequency information is largely obtained from the green component, while higher spatial frequency information is obtained from the red and blue components. Combining this information from the low and higher spatial frequencies produces optimal image quality with good picture sharpness.

Figure 7:
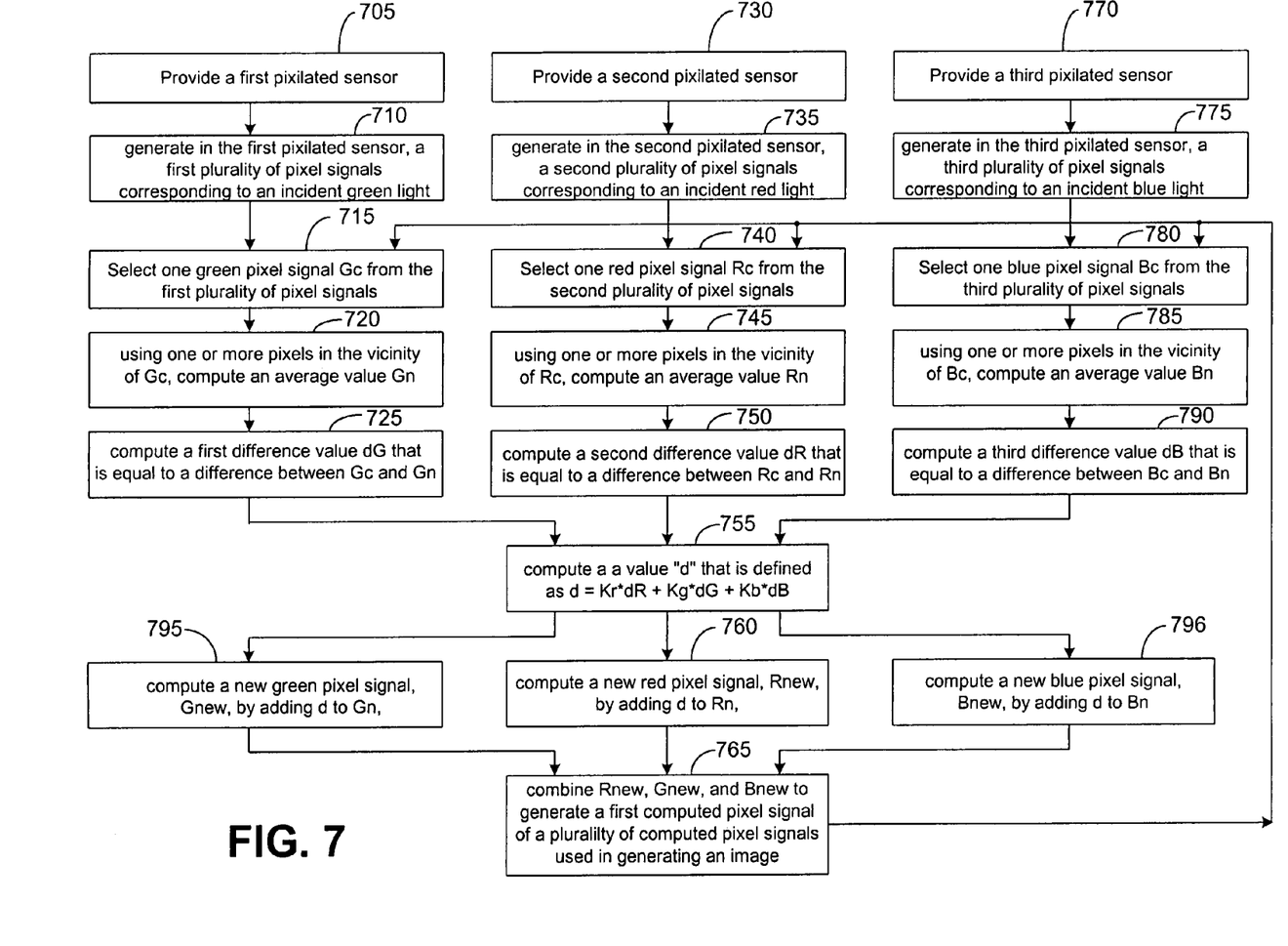
FIG. 7 shows a flowchart of a method for generating an image from three incident wavelengths.

FIG. 7 is a flowchart of an exemplary method used to generate an image. Certain elements of FIGS. 5A and 5B will be used, merely for purposes of explanation, to describe some blocks of FIG. 7. The numerical designators of FIGS. 5A and 5B can be recognized as they fall within the numerical range of 500–590, while those of FIG. 7 fall within the range of 700–796.

In block 705, a first pixilated sensor 530 is provided. In block 710, a number of pixel signals are generated in pixilated sensor 530 corresponding to incident green light on the sensor. The MTF for each of these pixel signals is a function of the incident angle, as represented in one example, by curve 610 of FIG. 6.

In block 715, a first green pixel signal, Gc, is selected corresponding to a first x-y coordinate in an image plane of pixilated sensor 530. Gc is processed as explained below. Other green pixel signals at other x-y locations related to sensor 530 are then processed in a similar fashion to create the image 590B of FIG. 5A. Image 590B is then used to compute composite image 590 of FIG. 5B.

In block 720, an average green value, Gn, is computed using one or more pixels in the vicinity of Gc. These pixels may be directly abutting Gc, or in other cases, located at distances away from Gc. In one example, a 3×3 array 589 of sensor elements, with the sensor element 541 as the central sensor element of the selected array, may be used for this computation. In a first exemplary computation, the average value will be computed from nine pixel signals—one signal Gc, from the central sensor element 541, and eight signals from the eight neighboring sensors elements of the 3×3 array 589. In a second exemplary computation, the average value will be computed from eight signals from the eight neighboring sensors elements of the 3×3 array 589, without including the signal Gc, from sensor element 541.

In block 725 a difference value dG is computed by obtaining the difference between green pixel signal Gc and the average green value Gn.

Turning to processing related to red light, in block 730, a second pixilated sensor 525 is provided. In block 735, a number of pixel signals are generated in pixilated sensor 525 corresponding to incident red light on the sensor. The MTF for each of these pixel signals is a function of the incident angle, as represented in one example, by curve 620 of FIG. 6.

In block 740, one red pixel signal, Rc, is selected corresponding to a first x-y coordinate in an image plane of pixilated sensor 525. Rc is processed as explained below. Other red pixel signals at other x-y locations related to sensor 525 are then processed in a similar fashion to create the image 590A of FIG. 5A. Image 590A is then used to compute composite image 590 of FIG. 5B.

In block 745, Rc is calculated in a manner that is similar to the calculation of Gc, which was explained above with reference to block 720. In block 750, dR is calculated in a manner that is similar to the calculation of dG, which was explained above with reference to block 725.

Now turning to processing related to blue light, in block 770, a third pixilated sensor 535 is provided. In block 775, a number of pixel signals are generated in pixilated sensor 535 corresponding to incident blue light on the sensor. The MTF for each of these pixel signals is a function of the incident angle, as represented in one example, by curve 615 of FIG. 6.

In block 780, one blue pixel signal, Bc, is selected. This blue pixel signal Bc, corresponds to a first x-y coordinate in an image plane of pixilated sensor 535. Bc is processed as explained below. Other blue pixel signals at other x-y locations related to sensor 535 are then processed in a similar fashion to create the image 590C of FIG. 5A. Image 590C is then used to compute composite image 590 of FIG. 5B.

In block 785, Bc is calculated in a manner that is similar to the calculation of Gc, which was explained above with reference to block 720. In block 790, dB is calculated in a manner that is similar to the calculation of dG, which was explained above with reference to block 725.

In block 755, a value "d" is computed using the formula: $d=Kr*dR+Kg*dG+Kb*dB$. The terms dR, dG, and dB correspond to red, green, and blue light respectively, as explained above. Kr, Kg, and Kb are coefficients that are determined for each of the colors, by the pixel location and the MTF of the lens. In an exemplary embodiment in accordance with the invention, $Kg+Kb+Kr=1$. The coefficients can be set to other values, in other embodiments. For example, additional weighting may be provided for one color over another. Consequently, in this case, the relationship between Kr, Kg, and Kb may be non-linear and not necessarily be an arithmetic sum adding up to a value of 1. The following exemplary embodiment uses the relationship $Kg+Kb+Kr=1$ to illustrate how these individual coefficients are determined for the flowchart of FIG. 7.

When block 755 is implemented with respect to green light, i.e., when blocks 705, 710, 715, 720, and 725 are implemented, Kg is determined by the location of the green sensor element at point 541B, and by the MTF of the green lens. The red and blue color MTF values can be considered as negligible at point 541B. Therefore, Kg=1, and Kr=Kb=0. If the selected green sensor element was located at a point in pixilated sensor 530 corresponding to an outer edge of region 550 (blue), Kg is set to equal 0, while Kr=Kb=0.5.

When block 755 is implemented with respect to red light, i.e., when blocks 730, 735, 740, 745, and 750 are implemented, Kr is determined by the location of the red sensor element in pixilated sensor 525, and the MTF of the red lens. The green and blue color MTF values can be considered as negligible along dotted line 546. Therefore, Kr=1, and Kg=Kb=0. If the selected red sensor element was located at a point in a central area of pixilated sensor 525 corresponding to point 541A, Kr is set to equal 0, while Kg=Kb=0.5.

When block 755 is implemented with respect to blue light, i.e., when blocks 770, 775, 780, 785, and 790 are implemented, Kb is determined by the location of the blue sensor element in pixilated sensor 535, and the MTF of the blue lens. The green and red color MTF values can be considered as negligible at a point on the dotted line 551. Therefore, Kb=1, and Kg=Kr=0. If the selected blue sensor element was located at a point in a central area of pixilated sensor 535 corresponding to a point 541C of region 540 (green), Kb is set to equal 0, while Kg=Kr=0.5.

In block 795, a new green pixel value Gnew is computed by adding 'd' to Gn. Similarly, in block 760, a new red pixel value Rnew is computed by adding 'd' to Rn, while in block 796, a new blue pixel value Bnew is computed by adding 'd' to Bn. In block 765, Rnew, Gnew, and Bnew are combined to generate the composite image that replicates an object to be imaged. The flowchart connection between block 765 and blocks 715, 740, and 780 is indicative of the iterative process whereby pixel-level signal information in each of the images 590A, 590B, and 590C are processed pixel-by-pixel to generate composite image 590.

In an exemplary embodiment, the pixel-by-pixel processing may be carried out by first selecting a set of green, red, and blue pixel sensor elements (in blocks 715, 740, and 780) that are used to compute signal information for a first pixel of composite image 590, followed by selecting a second set of green, red, and blue pixel sensor elements (again, in blocks 715, 740, and 780) that are used to compute signal information for a second pixel of composite image 590, and so on.

In alternative embodiments, blocks 725, 750, and 790 may incorporate computations other than a difference computation. For example, in block 725, rather than computing dG, a ratio rG can be computed. This ratio rG is obtained, in one example, by dividing Rc by Rn.

Similarly, in alternative embodiments, block 755 may incorporate computations other than the one shown in FIG. 7 for computing "d." It will be understood that any such computations of block 755 will include at least one coefficient that is defined using an MTF value. For example, if green light is used, Kg is included in computing a parameter such as "d" that is then used in one or more blocks, such as blocks 795, 760, and 796.

Figure 8:
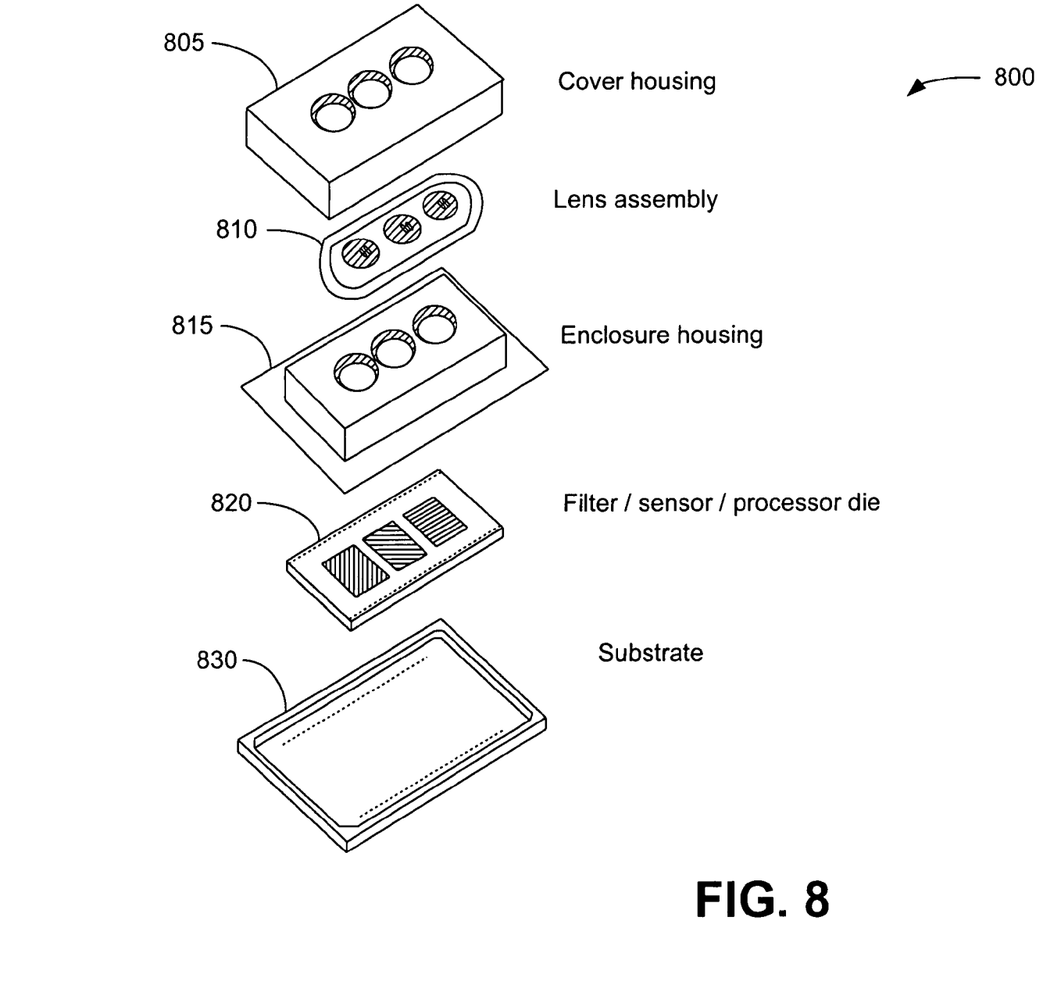
FIG. 8 shows a few individual parts that are assembled to form an imaging system having three individual lenses and three individual sensors.

FIG. 8 shows an exemplary embodiment of a three-lens system 800 where a first lens is configured to optimize the MTF of a wavelength corresponding to green light incident along the optical axis of the first lens, a second lens is configured to optimize the MTF of a wavelength corresponding to red light incident at a first angle with reference to the optical axis of the second lens, and a third lens is configured to optimize the MTF of a wavelength corresponding to blue light incident at a second angle with reference to the optical axis of the third lens. The lens assembly 810 contains the three lenses that are referred to above. Cover housing 805 is disposed upon enclosure housing 815, enclosing lens assembly 810 therein. The assembled three elements are then further disposed upon a die 820, which is then further disposed upon a substrate 830.

Die 820 contains three color filters, red, green, and blue corresponding to the red, green, and blue lenses in lens assembly 810. Die 820 may further house three sensor elements, each of which also correspond to the red, green, and blue lenses in lens assembly 810. Die 820 may further house one or more computing circuits to process the three signals from the three sensor elements and to generate the composite image. Additional aspects of system 800, such as external connections, electrical circuits, mechanical fasteners, and mounting hardware have been omitted in FIG. 8, for the sake of brevity.

The above-described embodiments in accordance with the invention are merely set forth for a clear understanding of the principles of the disclosure. Many variations and modifications may be made without departing substantially from the embodiments in accordance with the invention described herein. All such modifications and variations are included herein within the scope of the invention.

We claim:

1. An imaging system comprising:
   a first sensor configured to produce a first pixel-level image information from light of a first wavelength incident upon the first sensor;
   a first lens configured to direct towards the first sensor, multi-wavelength light received from an object to be imaged, the multi-wavelength light comprising light of the first wavelength, the first lens further configured to provide a first modulation transfer function (MTF) when light of the first wavelength is incident on the first lens at a first incident angle with reference to an optical axis of the first lens, the first MTF selected to provide optimal off-axis imaging of the object;
   a second sensor configured to produce a second pixel-level image information from light of a second wavelength incident upon the second sensor; and
   a second lens configured to direct towards the second sensor, multi-wavelength light from the object to be imaged, the multi-wavelength light comprising light of the second wavelength, the second lens further configured to provide a second MTF that is different than the first MTF, when light of the second wavelength is incident on the second lens along an optical axis of the second lens, the second MTF selected to provide optimal on-axis imaging of the object.

2. The imaging system of claim 1, wherein the first wavelength is different than the second wavelength.

3. The imaging system of claim 2, wherein the first and the second pixel-level image information are combined to generate an image of the object.

4. The imaging system of claim 1, further comprising:
   a third sensor configured to produce a third pixel-level image information from light of a third wavelength incident upon the third sensor; and
   a third lens configured to direct towards the third sensor, multi-wavelength light from the object to be imaged, the multi-wavelength light comprising light of the third wavelength, the third lens further configured to provide a third MTF when light of the third wavelength is incident on the third lens at a second incident angle with reference to an optical axis of the third lens, the third MTF selected to provide optimal off-axis imaging of the object.

5. The imaging system of claim 4, wherein the first and the second incident angles are different from one another.

6. The imaging system of claim 4, further comprising:
   a first color filter optically arranged in series between the first lens and the first sensor, the first color filter operative to generate light of the first wavelength from multi-wavelength light directed by the first lens through the first color filter towards the first sensor.

7. The imaging system of claim 6, further comprising:
   a second color filter optically arranged in series between the second lens and the second sensor, the second color filter operative to generate light of the second wavelength from multi-wavelength light directed by the second lens through the second color filter towards the second sensor.

8. The imaging system of claim 7, further comprising:
   a third color filter optically arranged in series between the third lens and the third sensor, the third color filter operative to generate light of the third wavelength from multi-wavelength light directed by the third lens through the third color filter towards the third sensor.

9. The imaging system of claim 4, wherein the first MTF is different than at least one of a) the second MTF and b) the third MTF.

10. The imaging system of claim 4, wherein the second incident angle is substantially the same as the first incident angle, and wherein the first MTF is substantially the same as the third MTF.

11. The imaging system of claim 4, wherein an effective MTF of the imaging system is equal to a mathematical combination of the first, second, and third MTFs.

12. The imaging system of claim 11, wherein the mathematical combination comprises a summation of the first, second, and third MTFs.

13. A method of imaging comprising:
   providing a first lens, a first color filter, and a first pixilated sensor;
   optically arranging in series, the first lens, the first color filter, and the first pixilated sensor;
   configuring the first lens to provide a first modulation transfer function (MTF) when multi-wavelength light containing light of a first wavelength is incident on the first lens at a first incident angle to an optical axis of the first lens, the multi-wavelength of light being received from an object to be imaged;
   configuring the first color filter to pass to the first pixilated sensor, the first wavelength of light contained in the multi-wavelength light;
   generating from the first pixilated sensor, a first image information comprising a first region of high MTF for light of the first wavelength;
   providing a second lens, a second color filter, and a second pixilated sensor;
   optically arranging in series, the second lens, the second color filter, and the second pixilated sensor;
   configuring the second lens to provide a second MTF when multi-wavelength light containing light of a second wavelength is incident on the second lens along an optical axis of the second lens, the multi-wavelength of light being received from the object to be imaged;

configuring the second color filter to pass to the second pixilated sensor, the second wavelength of light contained in the multi-wavelength light; and generating from the second pixilated sensor, a second image information comprising a second region of high MTF for light of the second wavelength.

14. The method of claim 13, further comprising:

providing a third lens, a third color filter, and a third pixilated sensor;

optically arranging in series, the third lens, the third color filter, and the third pixilated sensor;

configuring the third lens to provide a third MTF when multi-wavelength light containing light of a third wavelength is incident on the third lens at a third incident angle to an optical axis of the third lens, the multi-wavelength of light being received from the object to be imaged;

configuring the third color filter to pass to the third pixilated sensor, the third wavelength of light contained in the multi-wavelength light; and generating from the third pixilated sensor, a third image information comprising a third region of high MTF for light of the third wavelength.

15. The method of claim 14, further comprising combining the first, the second, and the third image information to generate a composite image of the object.

16. The method of claim 13, wherein the first region is different from the second region.

17. The method of claim 15, wherein the first, second, and third MTFs are selected to provide a desired composite MTF for generating the composite image of the object.

* * * * *